(12) United States Patent
Harding et al.

(10) Patent No.: US 10,472,971 B2
(45) Date of Patent: Nov. 12, 2019

(54) METHOD OF MANUFACTURE OF A TURBINE COMPONENT

(71) Applicants: ROLLS-ROYCE plc, London (GB); ROLLS-ROYCE DEUTSCHLAND LTD & CO KG, Blankenfelde-Mahlow, Dahlewitz (DE)

(72) Inventors: Adrian L Harding, Derby (GB); Jens Taege, Schoeneiche (DE)

(73) Assignees: ROLLS-ROYCE plc, London (GB); ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 498 days.

(21) Appl. No.: 15/232,596

(22) Filed: Aug. 9, 2016

(65) Prior Publication Data

US 2017/0159448 A1 Jun. 8, 2017

(30) Foreign Application Priority Data

Aug. 20, 2015 (GB) .................................. 1514801.8

(51) Int. Cl.
*B22F 3/15* (2006.01)
*F01D 5/14* (2006.01)
(Continued)

(52) U.S. Cl.
CPC ............ *F01D 5/147* (2013.01); *B22F 3/1055* (2013.01); *B22F 5/04* (2013.01); *B28B 1/001* (2013.01);
(Continued)

(58) Field of Classification Search
CPC ....... F01D 5/147; F01D 25/005; B29C 64/40; B29C 64/153; B22F 5/04; B22F 2003/1058; F05D 2230/02; F05D 2230/234
See application file for complete search history.

(56) References Cited

U.S. PATENT DOCUMENTS

| 5,745,834 A | 4/1998 | Bampton et al. |
| 7,556,477 B2 * | 7/2009 | Sherlock .................. F01D 5/20 416/224 |

(Continued)

FOREIGN PATENT DOCUMENTS

| EP | 2 022 622 A1 | 2/2009 |
| EP | 2 620 594 A1 | 7/2013 |

OTHER PUBLICATIONS

Wang, Fude, "Mechanical property study on rapid additive layer manufacture Hastelloy® X alloy by selective laser melting technology," International Journal of Advanced Manufacturing Technology, 2012, vol. 58, pp. 545-551.

(Continued)

*Primary Examiner* — Ninh H. Nguyen
(74) *Attorney, Agent, or Firm* — Oliff PLC

(57) ABSTRACT

A method for manufacturing a component having a defined geometry includes: a) defining a pre-component geometry including interim shape elements and additional, sacrificial elements for supporting interim elements; b) on a base plate, depositing multiple layers of a powder including a material from which the pre-component will be manufactured; c) sintering the powder to form the pre-component to the defined geometry; d) removing at least some of the sacrificial elements from the pre-component; e) subjecting the remaining pre-component from step d) to a HIP step; and f) removing remaining sacrificial elements from the pre-component product of step e) to provide a component to the defined component geometry. In the definition of the pre-component geometry, the interim elements differ from the corresponding final shape elements in the defined component geometry such that during the HIP step, the interim shape elements adjust to form final shape elements in the defined component geometry.

17 Claims, 3 Drawing Sheets

(51) Int. Cl.
   *B22F 3/105*   (2006.01)
   *B28B 1/00*    (2006.01)
   *F01D 25/00*   (2006.01)
   *B22F 5/04*    (2006.01)
   *C04B 35/645*  (2006.01)
   *B29C 64/153*  (2017.01)
   *B29C 64/40*   (2017.01)
   *B22F 5/00*    (2006.01)
   *B24C 1/10*    (2006.01)
   *B33Y 10/00*   (2015.01)

(52) U.S. Cl.
   CPC ............ *B29C 64/153* (2017.08); *B29C 64/40* (2017.08); *C04B 35/6455* (2013.01); *F01D 25/005* (2013.01); *B22F 5/009* (2013.01); *B22F 2003/1058* (2013.01); *B22F 2998/10* (2013.01); *B24C 1/10* (2013.01); *B33Y 10/00* (2014.12); *C04B 2235/6026* (2013.01); *F05D 2230/13* (2013.01); *F05D 2230/22* (2013.01); *F05D 2240/301* (2013.01); *F05D 2240/304* (2013.01); *F05D 2300/17* (2013.01); *Y02P 10/295* (2015.11)

(56) References Cited

U.S. PATENT DOCUMENTS

| | | | |
|---|---|---|---|
| 8,691,333 B2* | 4/2014 | Godfrey | B22F 3/1055 427/189 |
| 9,289,826 B2* | 3/2016 | Morris | B22F 3/1055 |
| 9,429,023 B2* | 8/2016 | Godfrey | F01D 5/14 |
| 2012/0234512 A1 | 9/2012 | Pickrell et al. | |
| 2013/0004680 A1 | 1/2013 | Godfrey et al. | |
| 2014/0034626 A1 | 2/2014 | Illston | |
| 2015/0093283 A1 | 4/2015 | Miller et al. | |
| 2018/0058771 A1* | 3/2018 | Butcher | B29D 23/00 |

OTHER PUBLICATIONS

Mar. 7, 2016 Search Report issued in British Patent Application No. 1514801.8.

Dec. 7, 2016 Search Report issued in European Patent Application No. 16 18 1428.

* cited by examiner

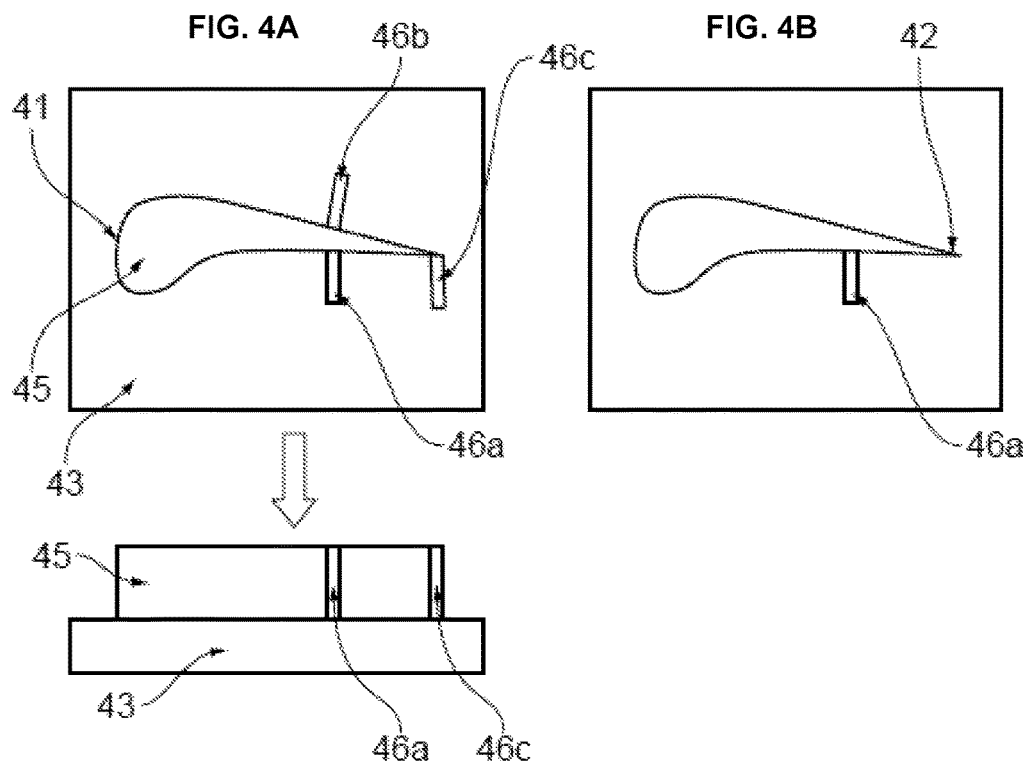
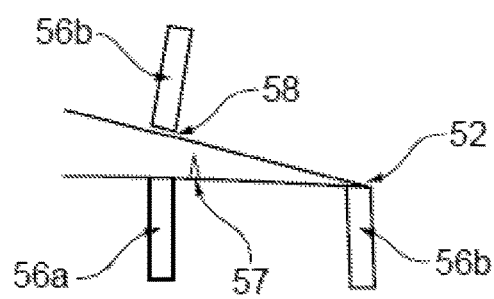
FIG. 5

METHOD OF MANUFACTURE OF A TURBINE COMPONENT

TECHNICAL FIELD

The present disclosure concerns the manufacture of an engineering component, for example a component of a gas turbine engine wherein the manufacturing method involves a hot isostatic pressing (HIP) step. More particularly, a method of manufacture involving an additive layer manufacturing (ALM) step and a HIP step is described.

BACKGROUND TO THE INVENTION

Additive layer manufacturing (ALM) methods are known. In these methods a component is built up layer by layer onto a base plate until the 3D component is defined. In some ALM methods, layers are created by selective treatment of layers within a mass of particulate material, the treatment causing cohesion of selected regions of particulates into a solid mass. For example, the particulate is a ferrous or non-ferrous alloy powder and the treatment involves local heating using a laser or electron beam. Specific examples of such ALM methods include (without limitation); laser sintering, laser melting, direct laser deposition (DLD) and electron beam melting (EBM).

Additive layer manufacturing (ALM) techniques are known for use in defining complex geometries to high tolerances and can be used as an alternative to casting. For large components with more complex geometries it is known to provide an ALM pre-component which incorporates sacrificial support structures in addition to the designed geometry of the component. These structures hold overhanging parts of the pre-component in position during completion of the ALM step when powder layers above the support structure are being treated and treated layers are solidifying into the designed component geometry. Whilst such supports are helpful in preserving the designed geometry and preventing sagging of overhanging parts, such supports can be a source of cracking and crack propagation in the pre-component.

When the component is a high performance engineering component, for example, a component of a gas turbine engine, further treatment steps are necessary to address porosity and/or weaknesses in the component surface which might result in failure of the component under high pressure, high stress and/or high temperature conditions. Processes may include blasting or peening the surface. Hot Isostatic Pressing (HIP) is one commonly used process which may be used optionally in addition to a blasting or peening step. A component is subjected to both elevated temperature and isostatic pressure in a high pressure containment vessel. Typically this step is carried out in an inert gas environment to avoid any chemical reaction between the component and the pressurizing gas. A pre-component made by an ALM method is typically subjected to the HIP step with the base plate and support structures still in position. These assist in preserving the designed geometry of the component during the HIP process. After completion of the HIP step, sacrificial elements of the pre-component (such as the base plate and support structures) are removed. The surface of the remaining component may then be finished in one or more optional finishing steps.

A prior art method is now described with reference to the accompanying FIG. 2. In the described method, a component is manufactured from a high-temperature alloy by a Powder Bed Direct Laser Deposition (PB DLD) or Direct Metal Laser Sintering (DMLS) additive manufacturing process. A powder bed 1 is raised into the path of a spreading device 2 which spreads a thin layer of powder across a base-plate 3. The base-plate typically comprises a tool steel. Selected regions of the powder corresponding to a shape which it is intended to build are fused together (and also to the base-plate) by heat from laser 4. The base-plate 3 is gradually lowered with respect to the laser during the process enabling layer upon layer of powder to be applied and sintered by the laser. This layering process can create one or more components 5 simultaneously. Additional support material in the form of support element 6 is used to support the pre-component during the DLD build process, to improve conformity to the desired shape. The additional support material typically comprises the same material as the pre-component and is solidified as part of the ALM step to provide sacrificial support elements. The support elements aid in limiting sagging of overhanging shape elements and also serve to control the profile of the pre-component.

Subsequent processing steps are performed on the pre-component. Firstly, the pre-component is optionally blasted with a blast media (for example, beads) to create a compressed layer at the external surface. This compressed layer imposes a compressive force on underlying material resisting the propagation of cracks from within the main body of the pre-component. The pre-component and baseplate are then subjected to a Hot Isostatic Pressing step. The HIP process substantially eliminates micro-cracks in the material structure, so improving the properties of the pre-component material. This is a particularly important step for high-temperature nickel alloys (often used in the manufacture of gas turbine engine components), which when produced by DLD alone are very susceptible to cracking due to high micro-porosity and residual stresses in the pre-component. The HIP step compresses the pre-component whilst heating it. After the HIP process has been completed, structural elements and the base plate are removed, for example by a subsequent low impact machining step.

SUMMARY OF THE INVENTION

According to a first aspect there is provided a method for the manufacture of a component having a defined geometry comprising;

a) defining a pre-component geometry comprising interim shape elements and additional, sacrificial elements for supporting interim shape elements;

b) on a base plate, depositing multiple layers of a powder comprising a material from which the component is to be manufactured;

c) sintering the powder to form the pre-component to the defined pre-component geometry;

d) removing at least some of the sacrificial elements from the pre-component;

e) subjecting the remaining pre-component from step d) to a HIP step; and, f) removing remaining sacrificial elements from the pre-component product of step e) to provide a component to the defined component geometry;

wherein in the definition of the pre-component geometry, the interim shape elements differ with respect to corresponding final shape elements in the defined component geometry such that during the HIP step, the interim shape elements adjust to form final shape elements in the defined component geometry.

The optimum positioning and area of contact of sacrificial support elements is difficult to define and differs from one material to another. Whilst advantageous and often used to prevent sagging of overhanging shape elements in the HIP step, the presence of these sacrificial support elements can be detrimental, adding to the already present stresses on the pre-component during the HIP step and resulting in localised crack propagation when the pre-component cools after the HIP step. Such cracking can lead to scrapping of a component which adds considerably to the cost of manufacture of such components.

However, if the sacrificial support elements are removed prior to the HIP step, for given HIP process parameters, any deformation of shape elements during the HIP process is resultant from gravitational assistance and the orientation of the pre-component in the HIP furnace. The skilled person will appreciate that for a given defined shape and orientation and with a knowledge of the HIP processing parameters, the gravitational impact on the pre-component during the HIP step is predictable and can be determined. The inventors propose that by reversing the calculation, a pre-component geometry can be defined which will predictably and reliably adjust to form a desired component geometry during the HIP process. This enables some or all of the support structures to be removed from the pre-component prior to the HIP step thereby reducing the risk of cracking in the post HIP component. Thus the scrappage rate of components produced by this manufacturing method can be reduced compared with the prior art methods and the cost of manufacture can also be reduced.

Optionally the method further includes an intermediate step taken between steps d) and e) involving blasting the pre-component with a blasting media whereby to provide a compressed outer layer.

A further advantage can arise from the removal of support elements immediately following the ALM step when an intermediate blasting step is performed between the ALM and HIP steps. The absence of the support elements (which would present a barrier to some parts of the shaped elements being impacted by the blast media) enables a more uniform compressed layer to be formed on the shaped element surfaces thereby potentially further improving the material properties of the finished component.

Subsequent to the HIP step, the sacrificial support elements and remaining base-plate may be removed by any of a number of known, low impact machining processes. For example but without limitation, such a removal step might involve; wire cutting, water-jet machining and/or laser cutting. Subsequent, optional finishing processes may optionally also be performed to complete the manufacture of the component.

In another aspect, the invention comprises a gas turbine engine incorporating one or more components manufactured in accordance with the method of the invention.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which:

FIG. 4A shows a first view of a pre-component at a first stage of a method according to the invention;

FIG. 4B shows a second view of a pre-component at a second stage of a method according to the invention;

FIG. 5 shows a pre-component substantially similar to that shown in FIGS. 4A and 4B which has been subjected to a HIP process without prior removal of some sacrificial support elements.

DETAILED DESCRIPTION OF DRAWINGS AND EMBODIMENTS

Figure 1:
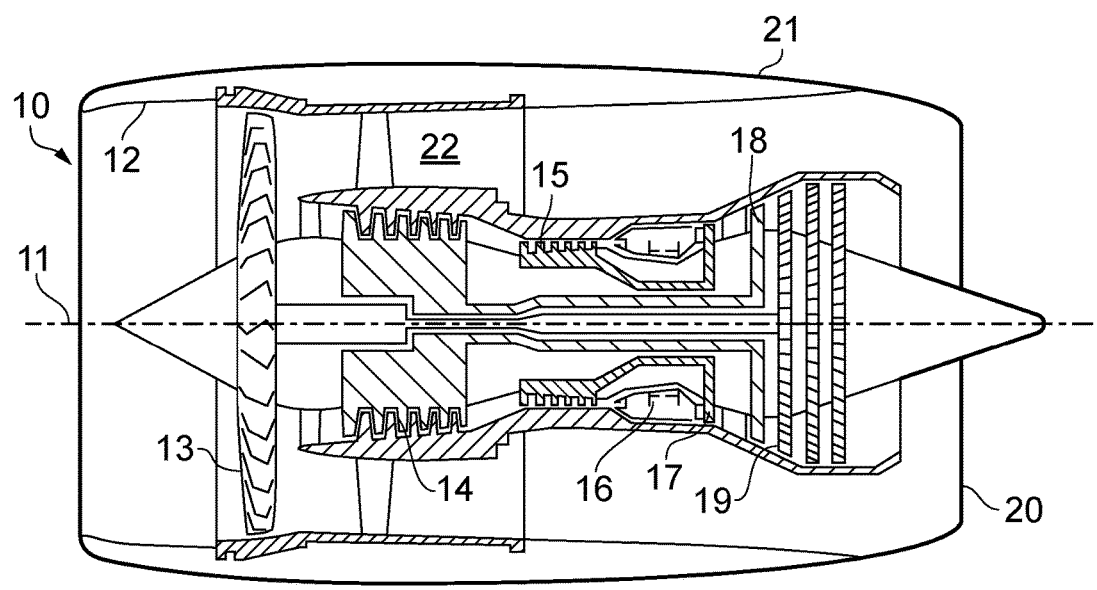
FIG. 1 is a sectional side view of a gas turbine engine which may comprise components made in accordance with the method of the invention.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Many components of the gas turbine engine could be manufactured by the method of the invention. For example (but without limitation), components in the turbine sections 17, 18 and 19, or the combustor 16 may be manufactured in accordance with the invention. The method is well suited to the manufacture of components with non-linear geometries.

Figure 2:
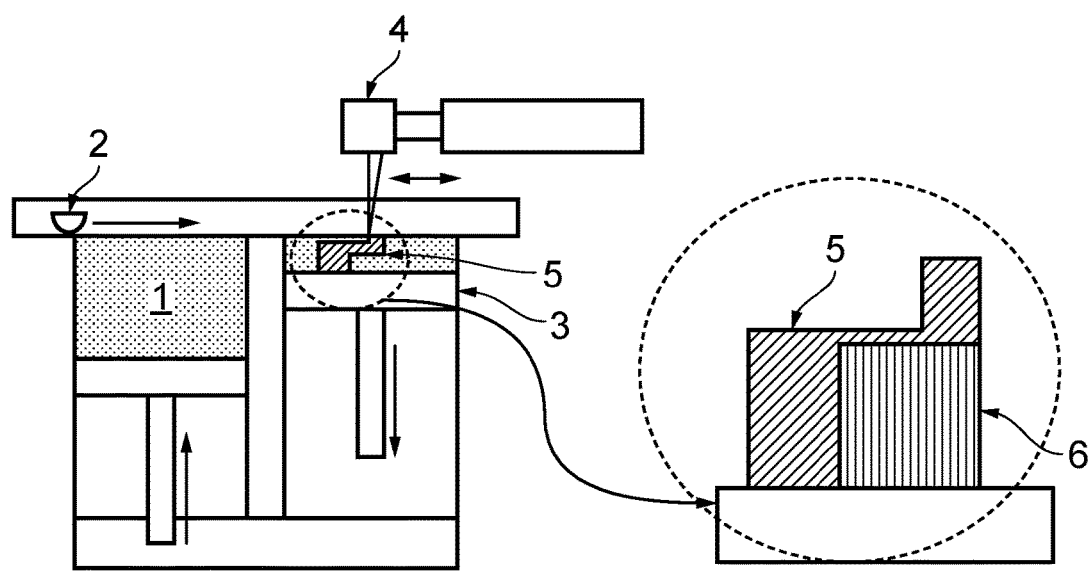
FIG. 2 shows schematically a pre-HIP ALM step known to be used in prior art manufacturing methods.
Figure 3:
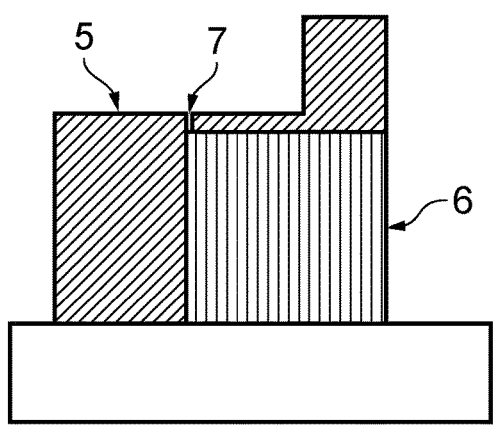
FIG. 3 shows schematically a likely site for propagation of a crack in the pre-component subjected to the method of FIG. 2.

FIG. 2 has been discussed above. During the HIP step of a pre-component as shown in FIG. 2, the support element 6 can add to the stresses in the pre-component during the HIP process, by restricting any shape change which might otherwise occur, for example, where a shape element overhangs from the main body of the pre-component and is supported by the support element. This can result in a large surface crack 7 at the vulnerable site as shown in FIG. 3.

FIGS. 4A and 4B show a pre-component having a shape element in the form of an aerofoil shaped body 45. The aerofoil has a leading edge end 41 and a trailing edge end 42. The pre-component has been built up on a powder bed 43. The pre-component further includes sacrificial supporting elements 46a,46b, 46c . FIG. 4A shows the pre-component at the end of the ALM process (steps b) and c) of the method). FIG. 4B shows the component after step d) but before step e) of the method. As can be seen from a comparison of the Figures, sacrificial elements 46a and 46b are removed prior to subjecting the pre-component to a HIP process. The pre-component 45 geometry is designed to distort during heating in the HIP process to provide an optimum desired aerofoil shape. For example, during HIPing the pre-component geometry curves in the region adjacent the trailing edge (for example from about the position of sacrificial elements 46a,46b to the edge 42).

FIG. 5 illustrates potential issues that might occur during the HIP process if sacrificial elements 56b and 56c (which compare to 46b and 46c) were retained during the HIP process. The trailing edge sacrificial support element 56c can over-restrain the thin shape element section approaching the trailing edge 52.

This can result in a crack 57 somewhere between the trailing edge 52 and the other supports 56a,56b .The support 56b,opposite 56a can result in local over-restraint. This can result in a peeling away of, for example support 56b from the shape element 55 resulting in a damaged section 58 on the surface. Damage at the surface could create weakness and a propensity for cracking in that region.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What we claim is:

1. A method for the manufacture of a component having a defined geometry comprising;
    a) defining a pre-component geometry comprising interim shape elements and additional, sacrificial elements for supporting interim shape elements;
    b) on a base plate, depositing multiple layers of a powder comprising a material from which the pre-component is to be manufactured;
    c) sintering the powder to form the pre-component to the defined pre-component geometry;
    d) removing at least some of the sacrificial elements from the pre-component;
    e) subjecting the remaining pre-component from step d) to a HIP step; and,
    f) removing any remaining sacrificial elements from the pre-component product of step e) to provide a component to the defined component geometry;
    wherein in the definition of the pre-component geometry, the interim shape elements differ with respect to corresponding final shape elements in the defined component geometry by design, such that during the HIP step, the interim shape elements adjust to form a final, overall shape of the elements in the defined component geometry.

2. A method as claimed in claim 1 further including an intermediate step taken between steps d) and e) involving blasting the pre-component with a blasting media whereby to provide a compressed outer layer.

3. A method as claimed in claim 1 wherein one or both of the removal steps involve; wire cutting, water-jet machining and/or laser cutting.

4. A method as claimed in claim 1 further comprising a finishing process after step f) to complete the manufacture of the component.

5. A method as claimed in claim 1 wherein the powder comprises a ferrous or non-ferrous alloy, or a ceramic.

6. A method as claimed in claim 5 wherein the powder comprises a high temperature Ni alloy.

7. A method as claimed in claim 1 wherein the sintering step involves heating with a laser.

8. A component manufactured in accordance with the method claim 1.

9. A component as claimed in claim 8 which is configured for use in a gas turbine engine.

10. A gas turbine engine comprising at least one component, the at least one component having the configuration as set out in claim 9.

11. A component as claimed in claim 8 wherein the component has an aerofoil cross section.

12. A component as claimed in claim 11 wherein the pre-component for the component comprises a structural element at a trailing edge of the aerofoil which is removed before the HIP step.

13. A gas turbine engine comprising at least one component, the at least one component having the configuration as set out in claim 12.

14. A component as claimed in claim 11 wherein the pre-component comprises a pair of oppositely facing structural elements arranged on opposite walls in a midsection of the aerofoil wherein one of the pair is removed before the HIP step.

15. A gas turbine engine comprising at least one component, the at least one component having the configuration as set out in claim 14.

16. A gas turbine engine comprising at least one component, the at least one component having the configuration as set out in claim 11.

17. A gas turbine engine comprising at least one component, the at least one component having the configuration as set out in claim 8.

* * * * *